United States Patent [19]

Fujita et al.

[11] 4,160,673

[45] Jul. 10, 1979

[54] LOW TEMPERATURE CALCINED PORCELAIN AND PROCESS FOR PREPARATION THEREOF

[75] Inventors: Toshio Fujita, Nagoya; Hironaga Teratani, Owariasahi, both of Japan

[73] Assignee: Nippon Kouatsu Electric Co., Japan

[21] Appl. No.: 865,947

[22] Filed: Dec. 30, 1977

[30] Foreign Application Priority Data

Jan. 13, 1977 [JP]  Japan .................................. 52-2706
Oct. 5, 1977 [JP]  Japan .............................. 52-119767

[51] Int. Cl.$^2$ ...................... C04B 33/24; C04B 33/26
[52] U.S. Cl. ......................................... 106/45; 106/46
[58] Field of Search ................................. 106/45, 46

[56] References Cited

U.S. PATENT DOCUMENTS

| | | | |
|---|---|---|---|
| 2,652,338 | 9/1953 | Greger | 106/45 |
| 3,019,116 | 1/1962 | Doucette | 106/46 |
| 3,436,451 | 4/1969 | Wasser | 106/46 |
| 3,540,894 | 11/1970 | McIntosh | 106/46 |
| 3,698,920 | 10/1972 | Pitha | 106/46 |
| 3,935,017 | 1/1976 | Gardner | 106/46 |
| 4,039,338 | 8/1977 | Swiss et al. | 106/46 |

FOREIGN PATENT DOCUMENTS

51-17206  12/1976  Japan ..................................... 106/45

Primary Examiner—O. R. Vertiz
Assistant Examiner—Mark Bell
Attorney, Agent, or Firm—Jacobs & Jacobs

[57] ABSTRACT

A low temperature calcined porcelain composed mainly of a vitreous substance and including aluminum oxide, a clay component, a binder and, if necessary, a coloring agent is disclosed. This porcelain is prepared according to a process comprising adding water to a mixture composed mainly of a vitreous substance and including alumina, silica or a naturally occurring composition of alumina and silica, a binder and, if necessary, a coloring agent, molding the mixture into an optional form by compression molding or by kneading molding, and calcining (heating and hardening) the molded article at a relatively low temperature.

10 Claims, 2 Drawing Figures

CALCINATION TEMPERATURE 600 °C ( 1 x 10³ )

CALCINATION TEMPERATURE 700 °C ( 1 x 10³ )

LOW TEMPERATURE CALCINED PORCELAIN AND PROCESS FOR PREPARATION THEREOF

BACKGROUND OF THE INVENTION

(1) Field of the Invention

The present invention relates to a low temperature calcined porcelain which can be effectively used broadly not only in fields where colored or colorless synthetic resin articles have heretofore been used but also in fields where ordinary ceramic products such as porcelains and china products have heretofore been used, especially in fields where high dimensional precision is required, for example, as construction materials or in electrical appliances and the like.

(2) Description of the Prior Art

Known plastics such as phenolic resins, polyester resins and urea resins are excellent in various properties such as moldability, chemical resistance and electric characteristics.

However, they have a defect in that they are readily burnt and generate large quantities of poisonous gases or smoke on combustion.

Recently, low temperature (1200°–1300° C.) calcined porcelains and low melting point inorganic compositions have been developed. They are used in the calcined state or they are first subjected to a heating reaction and then calcined. Namely, in these materials, the step of molding under heating cannot be avoided.

Because of the complexity of this step, the conventional processes using these materials have not now wide acceptance in the art.

The present invention relates to a novel, colored or colorless, low temperature calcined procelain and a process for the preparation thereof. More specifically, the present invention relates to an inorganic molded article being excellent in incombustibility, heat resistance and chemical resistance and having high strength and good dimensional stability, which is formed by conducting calcination only once at a relatively low temperature of about 650° to about 750° C., and to a process for the preparation of such inorganic molded article.

BRIEF SUMMARY OF THE INVENTION

The present invention relates to a colored or colorless, low temperature calcined porcelain and a process for the preparation thereof.

It is a primary object of the present invention to provide a process for the preparation of low temperature calcined procelains, in which calcination is carried out at a relatively low temperature of about 650° to about 750° C. Since the calcination is conducted at such low temperature, the volume reduction by calcination is very small and therefore, the porcelain of the present invention is characterized in that the dimensional precision is very high. Accordingly, there is attained an advantage that a metal fittings or the like can be inserted into the molded article and the molded article can be heated and hardened in this state, and therefore, the range of applications of the porcelain of the present invention is remarkably broad.

Another object of the present invention is to provide a porcelain composition which can easily be colored. Namely, according to the present invention, there can be obtained various products differing in color, which are excellent in the aesthetic effect. It is construed that the reason why such coloration is possible is probably that the starting material is heated approximately to a molten state and the coloring agent used is molten and intermingled uniformly into the composition.

Still another object of the present invention is to provide a process for the preparation of colored or colorless porcelains which comprises adding water to a mixture composed mainly of a vitreous substance and including alumina, silica or a composition of alumina and silica and, if necessary, a coloring agent, molding the mixture into an optional form by appropriate means, and calcining the molded article at a relatively low temperature.

DETAILED DESCRIPTION OF THE PREFERRED EMBODIMENTS

Figure 1:
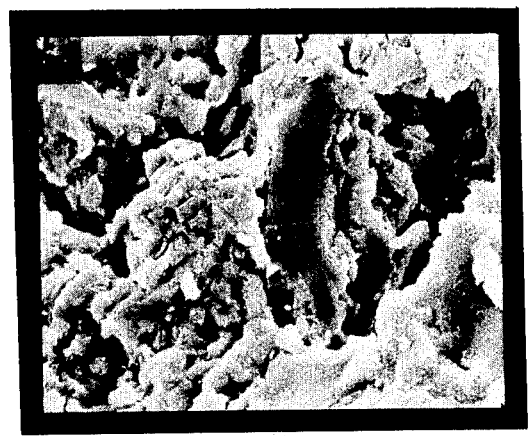
FIG. 1 is an electron microscope photograph (the magnification being $1 \times 10^3$) of the surface of a plate-like porcelain obtained in Example 1 (the calcination temperature being 600° C.) as a comparative product to be contracted with the product of the present invention.

The present invention relates to a colored or colorless porcelain obtained by low temperature calcination of a composition composed mainly of a vitreous substance and including aluminum oxide ($Al_2O_3$), a clay component, a binder and, if necessary, a coloring agent, and to a process for the preparation of such procelain.

More specifically, the procelain of the present invention is obtained by adding water to a mixture comprising (a) a vitreous substance, (b) aluminum oxide, (c) a clay component, (d) a binder and, if necessary, (e) a coloring agent to form a composition having the composition indicated below, molding the composition into an optional form and heating and hardening the molded composition at a relatively low temperature, specifically about 650° to about 750° C., for about 30 minutes to about 5 hours, preferably about 3 hours.

|     | Components | % by weight |
| --- | --- | --- |
| (a) | Vitreous substance (glass cullet) | about 40 to about 60% |
| (b) | Aluminum oxide | about 10 to about 30% |
| (c) | Clay component | about 10 to about 25% |
| (d) | Binder | about 5 to about 15% |
| (e) | Coloring agent (optional component) | up to about 5% |

Glass cullet is preferably used as the vitreous substance (a) in the present invention. For example, pulverized waste glass formed by breakage of glass products or scraps of glass products produced in the process for production of glass products may be advantageously used.

The vitreous substance (a) is used in an amount of about 40 to about 60% by weight (based on the water-incorporated mixture before molding; the same applies hereinafter). If the amount of the vitreous substance is smaller than about 40% by weight, vitrification is not caused. From this fact, it is seen that the vitreous substance acts as a flux. If the amount of the vitreous substance is larger than about 60%, contraction is extreme at the heating and hardening step and a defect of low dimensional precision is caused.

Aluminum oxide easily commercially available as alumina, which has a particle size of about 1 to 60μ, is ordinarily used as the component (b) in the present invention.

The alumina is usually employed in an amount of about 10 to about 30% by weight. If the amount of the alumina component is smaller than the lower limit of about 10% by weight, the strength of the product is insufficient and the product cannot be applied to various fields intended in the present invention. From this fact, it is apparent that the alumina acts as the aggregate (reinforcer). When the amount of the alumina is larger than 30% by weight, vitrification is not caused by heating and hardening and no good results are obtained.

The clay component (c) that is used in the present invention is easily commercially available. More specifically, a clay composed mainly of a fine alumina-silicate substance (so-called clay mineral) and having a high plasticity can be used as the clay component. As is well-known, such clay component generally has a chemical composition of the three-component series $Al_2O_3$-$SiO_2$-$H_2O$ and a porcelain having a higher fire resistance can be obtained from a clay component having a higher $Al_2O_3/SiO_2$ ratio. From this fact, it must be understood that the clay component that is used in the present invention comprehensively includes soils and clays containing a silicate mineral, having a functions as the aggregate and being composed of fine particles having a size not exceeding about 0.01 mm. More specifically, the clay component that is used in the present invention includes kaolin, bentonite, gairome-clay, hallosite, diaspore clay, sericite, pyrophyllite, quartz, etc.

In the present invention, the clay component is used in an amount of about 10 to about 25% by weight. When the amount of the clay component is smaller than the lower limit of about 10% by weight, the moldability is degraded and good results are not obtained. In contrast, when the clay component is used in an amount exceeding about 25% by weight, calcination is impossible at a low temperature and therefore, vitrification is not caused at the temperatures specified in the present invention.

From the foregoing, it will be understood that the clay component is valuable for improving the moldability and dimensional stability.

At any rate, in the present invention, it is preferred to adjust the hardening temperature by incorporating the clay component in an appropriate amount into the above-mentioned alumina.

In the present invention, the binder (d) is used as a component for binding and integrating the starting components together when the mixture is calcined or molded.

As the binder (d), phosphoric acid or a phosphate is preferably used. As the phosphoric acid that is used in the present invention, there can be mentioned known phosphoric acids such metaphosphoric acid, orthophosphoric acid, triphosphoric acid and tetraphosphoric acid.

Such phosphoric acid is easily soluble in water. Accordingly, the phosphoric acid can be used in the form of an aqueous solution and the water content in the starting mixture can be adjusted to a desired level by controlling the amount used of the aqueous solution. Of course, this embodiment is included in the scope of the present invention.

As the phosphate that is used as the binder in the present invention, there can be mentioned alkali metal, alkaline earth metal and aluminum salts of phosphoric acid.

Sodium phosphate is especially preferably used as the alkali metal phosphate, and magnesium phosphate is preferred as the alkaline earth metal phosphate.

Further, the phosphate includes alkali metal, alkaline earth metal and aluminum salts of polyphosphoric acids, and sodium tetrapolyphosphate is especially preferred among these polyphosphates.

These phosphoric acids and phosphates may be used singly or in the form of a mixture of two or more of them.

In the present invention, the binder is used in an amount of about 5 to about 15% by weight. If the amount of the binder is smaller than about 5% by weight, vitrification of the composition is not caused, and the strength of the resulting product is poor. If the amount of the binder is larger than about 15% by weight, firing blisters are formed in the product and the water absorption is enhanced, and therefore, no good results are obtained.

A coloring agent (e) may be incorporated in an amount of up to about 5% by weight into the starting mixture that is used in the present invention. For example, metal oxides described below can be mentioned as the coloring agent (metal compounds that can be converted to oxides under heating, for example, carbonates, are included). These metal oxides impart the following color to resulting products.

Red iron oxides ($Fe_2O_3$): red
Chromium oxide: green
Titanium oxide: yellowish white
Cobalt oxide: blue
Triiron tetroxide ($Fe_3O_4$): black It has been found that these coloring agents are also effective for improving the water resistance in the resulting product.

In the present invention, in order to improve the fire resistance in the resulting product, a small amount of an oxide or carbonate of magnesium, calcium, zinc, manganese or the like may be incorporated into the starting mixture before molding.

The process for preparing colored, low temperature calcined procelains according to the present invention will now be described in detail.

Commercially available products of the foregoing components (a) to (e) are used as they are or after they have been pulverized into fine particles having a size smaller than 500μ, preferably smaller than 100μ, by using known pulverizing means, for example, a ball mill, a roll crusher or the like.

Then, the molding operation is carried out according to any of the following embodiments (1) and (2).

EMBODIMENT (1)

Water is added in an amount of about 1 to about 15% by weight to a mixture of the pulverized components (a) to (e), and they are mixed under agitation to form a homogeneous mixture. When the amount of water is smaller than about 1% by weight, hardening under heating is impossible. On the other hand, when the water content is higher than about 15% by weight, there is brought about a disadvantage that compression molding becomes difficult.

When a water-soluble compound is used as the starting component as described hereinbefore, the water-soluble compound may be used in the form of an aqueous solution so that the total water content is controlled to fall within the above-mentioned range. Of course, this modification is included in the technical scope of the present invention.

At the above mixing step, agitation is performed according to known means.

The water-incorporated pulverized mixture is compression-molded into an optional form, for example, plate, pipe, bar or honeycomb, by using a pressing machine or the like.

EMBODIMENT (2)

Water is added in an amount of about 10 to about 30% by weight to a mixture of the pulverized components (a) to (e), and they are mixed together by means of a ball mill, a vacuum soil kneading machine, a kneader or the like. If the amount of water is smaller than about 10% by weight, extrusion molding is difficult, and when the amount of water is larger than 30% by weight, there is brought about a defect that the dimensional stability of the product is degraded. The resulting slurry is then kneaded and molded into an optional form by a pressing machine or extruder.

The molded product obtained according to any of the foregoing embodiments (1) and (2) is dried according to need, and it is then heated and hardened. Ordinary heating furnaces such as a tunnel kiln, a shuttle kiln or the like may be used.

In the present invention, the heating temperature is maintained in the range of from about 650° C. to about 750° C. If the heating temperature is lower than about 650° C., calcination is incomplete and vitrification is not caused, and there is brought about a disadvantage that the resulting product is inferior in the strength and water resistance. When the heating temperature is higher than about 750° C., such defects as blisters are formed on the product and good results are not obtained.

When it is desired to reduce the water absorption in products obtained according to the present invention, it is possible to subject these products to a finishing treatment including, for example, the steps of impregnating a product with a heat-resistant paint such as a silicone varnish and naturally drying or heating and hardening the impregnated product. According to such finishing treatment, there can be obtained colored porcelain products having desirable properties.

Properties of a low temperature calcined porcelain molded product obtained according to the present invention and of an ordinary procelain and plastics are shown in Table 1.

Table 1
(Comparison of Properties)

| Properties | Product of Present Invention | Ordinary Porcelain | Plastics | | |
|---|---|---|---|---|---|
| | | | Urea Resin | Phenolic Resin | Premix* |
| Specific gravity (g/cm$^3$) | 2.0–2.4 | 2.4 | 1.47–1.52 | 1.32–1.45 | 1.8–2.3 |
| Water absorption (%) | 0.0–0.5 | 0.0–1.0 | 0.5–0.9 | 0.1–0.3 | 0.06–0.28 |
| Heat-resistant temperature | — | — | 80° C. | 150°–180° C. | 170°–200° C. |
| Thermal expansion coefficient | $1.0 \times 10^{-5}$/°C. | $0.52 \times 10^{-5}$/°C. | $2.7 \times 10^{-5}$/°C. | $3.0–4.5 \times 10^{-5}$/°C. | $2.5–3.3 \times 10^{-5}$/°C. |
| Combustibility | incombustible | incombustible | much delayed combustion | much delayed combustion | self-extinguishing |
| Mechanical Properties | | | | | |
| flexural strength (kg/cm$^2$) | 600–800 | 400–700 | 600–1,000 | 500–1,000 | 300–800 |
| elasticity modulus (kg/cm$^2$) | $2.5–3.7 \times 10^5$ | $7 \times 10^5$ | $1.0 \times 10^5$ | $0.78 \times 10^5$ | $1.0 \times 10^5$ |
| compression strength (kg/cm$^2$) | 3,500–5,000 | 3,500 | 1,700–2,800 | 1,500–2,500 | 1,400–1,800 |
| impact strength (kg-cm) | 0.2 | 0.2 | 1.4–2.2 | 1.5–3.4 | 8.2–8.7 |
| Mohs hardness | 7 | 7 | — | — | — |
| Shore hardness | 80.0–95.0 | 75.0–90.0 | below 20.0 | below 20.0 | 20.0 |
| Electric Characteristics | | | | | |
| arc resistance (sec.) | above 200 | above 200 | 80–150 | tracking | 140–180 |
| volume resistivity (Ω-cm) | $>10^{13}$ | $>10^{13}$ | $10^{12}–10^{13}$ | $10^9–10^{13}$ | $10^{12}–10^{15}$ |
| short time insulating strength (kv/mm) | 10.0 | 10.0 | 11.0–16.0 | 8.0–17.0 | 13.0–17.0 |
| Weather-ometer exposure (200 hours) | not changed | not changed | wrinkles formed on surface | slightly discolored | slightly changed |
| Boiling test | not changed for 24 hours | not changed for 24 hours | resisted only for 15 minutes | not changed for 1 hour | not changed for 1 hour |

*polyester premix containing calcium carbonate and glass fiber

From data shown in Table 1, it will readily be understood that the molded product obtained according to the present invention is comparable or much superior to ordinary porcelains or plastics with respect to various properties (especially mechanical and electric properties).

It is expected that the products of the present invention can be used in various fields. For example, they can be used, though the application fields are not limited to these in the present invention.

The present invention will now be described in detail by reference to the following examples that by no means limit the scope of the invention.

EXAMPLE 1

A mixture having the following composition (having a size not exceeding 100μ) was prepared.

| Component | % by weight |
| --- | --- |
| glass (cullet) | 42% |
| aluminum oxide | 24% |
| clay | 14% |
| binder (aluminum primary phosphate) | 0.7% |
| binder (sodium tetrapolyphosphate) | 9.3% |
| coloring agent (red iron oxide) | 3.5% |
| water | 6.5% |

The mixture was molded into plates by a pressing machine, and they were calcined for 30 minutes in an electric furnace maintained at 600, 650, 700, 750 or 800° C. to obtain reddish brown plate-like procelains having properties shown in Table 2.

Table 2

| | Calcination Temperature (°C.) | | | | |
| --- | --- | --- | --- | --- | --- |
| | 600 | 650 | 700 | 750 | 800 |
| Flexural strength (kg/cm$^2$) | 370 | 612 | 832 | 650 | 350 |
| Water absorption (%) | 2.9 | 1.1 | 0.11 | 0.1 | 0.1 |
| Shrinkage factor (%) | 1.2 | 1.8 | 4.8 | 3.0 | 0.5 |

The surface conditions of the products obtained by conducting calcination at 600° C. or 700° C. were examined by using a scanning type electron microscope at a magnification of 1 × 10$^3$.

Figure 2:
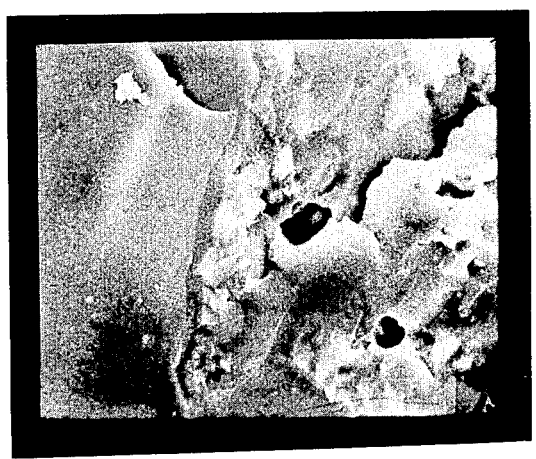
FIG. 2 is an electron microscope photograph (the magnification being $1 \times 10^3$) of the surface of a plate-like porcelain obtained in Example 1 (the calcination temperature being 700° C.) included in the scope of the present invention.

As a result, it was found that when the calcination was carried out at 600° C., vitrification was not caused (see FIG. 1) but when the calcination was carried out at 700° C., the product was vitrified (see FIG. 2).

It was further confirmed that when the calcination temperature was higher than 750° C., blisters were formed on the resulting product.

EXAMPLE 2

In the same manner as described in Example 1, the following composition was prepared.

| Component | % by weight |
| --- | --- |
| glass (cullet) | 50% |
| aluminum oxide | 20% |
| clay | 10% |
| binder (aluminum primary phosphate) | 2% |
| binder (sodium tetrapolyphosphate) | 10% |
| coloring agent (1:4 mixture of aluminum oxide and cobalt chloride) | 3% |
| water | 5% |

In this example, however, a ball mill was used for mixing and pulverization.

Various porcelain products were prepared according to procedures described in Example 1. Properties of these products are shown in Table 3.

Table 3

| | Calcination Temperature (°C.) | | | | |
| --- | --- | --- | --- | --- | --- |
| | 600 | 650 | 700 | 750 | 800 |
| Flexural strength (kg/cm$^2$) | 280 | 670 | 730 | 665 | 375 |
| Water absorption (%) | 4.2 | 1.0 | 0.4 | 0.0 | 0.1 |
| Shrinkage factor (%) | 1.1 | 2.2 | 2.8 | 2.2 | +0.5 |

Each of the products obtained in this Example had a blue color.

Experiments were repeated according to procedures described in Examples 1 and 2 and the results shown below were obtained.

EXAMPLE 3

Composition of starting mixture:

| | |
| --- | --- |
| glass (cullet) | 55% by weight |
| aluminum oxide | 15% by weight |
| clay | 12% by weight |
| binder (sodium tetrapolyphosphate) | 12% by weight |
| coloring agent (1:3:1 mixture of titanium oxide, antimony oxide and chromium oxide) | 2% by weight |
| water | 4% by weight |

Calcination temperature: 700° C.
Physical properties:
 flexural strength: 650 kg/cm$^2$
 water absorption: 0.2%
 shrinkage factor: 3.5%
Color of product:
 slightly yellowish white

EXAMPLE 4

Composition of starting mixture:

| | |
| --- | --- |
| glass (cullet) | 42% by weight |
| aluminum oxide | 28% by weight |
| clay | 12% by weight |
| binder (aluminum primary phospate) | 2% by weight |
| binder (sodium tetrapolyphosphate) | 4% by weight |
| coloring agent (chromium oxide) | 3% by weight |
| water | 9% by weight |

Calcination temperature: 700° C.
Physical properties:
 flexural strength: 675 kg/cm$^2$
 water absorption: 0.1%
 shrinkage: 3.0%
Color of product:
 green When the above mixture was calcined at an elevated temperature of 800° C., formation of blisters was observed.

EXAMPLE 5

Composition of starting mixture:

| | |
| --- | --- |
| glass (cullet) | 42.0% by weight |
| aluminum oxide | 27.5% by weight |
| clay | 14.0% by weight |
| binder (aluminum primary phosphate) | 0.7% by weight |
| binder (sodium tetrapolyphosphate) | 9.3% by weight |
| water | 6.5% by weight |

Calcination temperature: 680° C.
Color of product:
 colorless (slightly white

EXAMPLE 6

Composition of starting mixture:

| | |
|---|---|
| glass (cullet) | 42.0% by weight |
| aluminum oxide | 26.0% by weight |
| clay | 14.0% by weight |
| binder (aluminum primary phosphate) | 0.7% by weight |
| binder (sodium tetra-polyphosphate) | 9.3% by weight |
| coloring agent (titanium oxide) | 1.5% by weight |
| Calcination temperature: 680° C. | |
| Color of product: white | |

What we claim is:

1. A low temperature calcined porcelain consisting essentially of (a) about 40 to about 60% weight of pulverized waste glass, (b) about 10 to about 30% weight of aluminum oxide, (c) about 10 to about 25% weight of a fine alumina-silicate substance having a high plasticity, and (d) about 5 to about 15% weight of phosphoric acid and/or phosphate, and further, optionally, up to about 5% weight of a metal oxide as a coloring agent, the calcining temperature being in the range of from about 650° to 750° C.

2. A colored low temperature calcined porcelain according to claim 1, wherein the metal oxide is at least one metal oxide selected from the group consisting of red iron oxide, chromium oxide, titanium oxide, cobalt oxide, and triiron tetraoxide.

3. A low temperature calcined porcelain according to claim 1, wherein the fine alumina-silicate substance having a high plasticity is at least one material selected from the group consisting of kaolin, bentonite and gairome-clay.

4. A colored or colorless, low temperature porcelain according to claim 1, wherein the phosphate is at least one phosphate selected from the group consisting of sodium phosphate, magnesium phosphate and sodium tetrapoly phosphate.

5. A process for the preparation of colored or colorless, low temperature calcined porcelains, which comprises adding water in an amount of 1 to 15% by weight to a mixture comprising 40 to 60% by weight of pulverized waste glass, 10 to 30% by weight of aluminum oxide, 10 to 25% by weight of finely divided alumina-silicate having high plasticity, 5 to 15% by weight of phosphoric acid and/or a phosphate and up to 5% by weight of a metal oxide as a coloring agent as an optional component, subjecting the resulting mixture to compression molding and calcining the molded product at a temperature of 650° to 750° C.

6. A process according to claim 5, wherein the metal oxide is at least one metal oxide selected from the group consisting of red iron oxide, chromium oxide, titanium oxide, cobalt oxide, and tri-iron tetraoxide.

7. A process according to claim 5, wherein the phosphate is at least one phosphate selected from the group consisting of sodium phosphate, magnesium phosphate and sodium tetrapolyphosphate.

8. A process for the preparation of colored or colorless, low temperature calcined porcelains, which comprises adding water in an amount of 10 to 30% by weight to a mixture comprising 40 to 60% by weight of pulverized waste glass, 10 to 30% by weight of aluminum oxide, 10 to 25% by weight of finely divided alumina-silicate having high plasticity, 5 to 15% by weight of phosphoric acid and/or a phosphate, and up to 5% by weight of a metal oxide as a coloring agent as an optional component, kneading and molding the resulting mixture and calcining the molded product at a temperature of 650° to 750° C.

9. A process according to claim 8, wherein the phosphate is at least one phosphate selected from the group consisting of sodium phosphate, magnesium phosphate and sodium tetrapoly phosphate.

10. A process according to claim 8, wherein the metal oxide is at least one metal oxide selected from the group consisting of red iron oxide, chromium oxide, titanium oxide, cobalt oxide, and tri-iron tetraoxide.

* * * * *